US011406069B2

United States Patent
Vyas et al.

(10) Patent No.: US 11,406,069 B2
(45) Date of Patent: Aug. 9, 2022

(54) VINING PLANT SUPPORT VIA VERTICAL POSTS AND MODULAR BRACES

(71) Applicants: Anisha S. Vyas, Kennesaw, GA (US); Jessie M Kapoor, Hilliard, OH (US); Parveen S. Kapoor, Satellite Beach, FL (US); Shabnam D. Satyarthi, Princeton, NJ (US)

(72) Inventors: Anisha S. Vyas, Kennesaw, GA (US); Jessie M Kapoor, Hilliard, OH (US); Parveen S. Kapoor, Satellite Beach, FL (US); Shabnam D. Satyarthi, Princeton, NJ (US)

( * ) Notice: Subject to any disclaimer, the term of this patent is extended or adjusted under 35 U.S.C. 154(b) by 302 days.

(21) Appl. No.: 16/354,095

(22) Filed: Mar. 14, 2019

(65) Prior Publication Data

US 2019/0289797 A1    Sep. 26, 2019

Related U.S. Application Data

(60) Provisional application No. 62/646,876, filed on Mar. 22, 2018.

(51) Int. Cl.
*A01G 17/14* (2006.01)

(52) U.S. Cl.
CPC .................... *A01G 17/14* (2013.01)

(58) Field of Classification Search
CPC .......... A01G 9/12; A01G 9/122; A01G 9/124; A01G 9/128; A01G 17/04; A01G 17/06; A01G 2017/065; A01G 17/08; A01G 17/085; A01G 17/10; A01G 17/12; A01G 17/14

USPC ........... 47/47, 42, 44, 46; 248/530, 535, 539
See application file for complete search history.

(56) References Cited

U.S. PATENT DOCUMENTS

| | | | | |
|---|---|---|---|---|
| 5,473,839 A | * | 12/1995 | Stidham | A01G 17/04 248/156 |
| 6,299,125 B1 | * | 10/2001 | Zayeratabat | A01G 9/122 248/218.4 |
| 6,702,239 B2 | * | 3/2004 | Boucher | A01G 9/122 248/125.8 |
| 2015/0033623 A1 | * | 2/2015 | Mauro | A01G 9/12 47/47 |

* cited by examiner

*Primary Examiner* — William V Gilbert

(57) ABSTRACT

A vertical plant support system that is anchored into the ground by a stake to provide a solid support which holds a long hollow rectangular prism that is attached to it. This hollow rectangular prism has holes throughout its length on all 4 sides. A brace-like attachment is then attached to the hollow rectangular prism using the holes as a point of contact at various points of the growth of the vertical growing plants. These braces can be attached at any time during the growth of the plant. Additionally, there is a connection piece that connects 2 hollow rectangular prisms in order to vertically extend the height of the support system. This allows the full vertical support system to grow indeterminately along with the plant. This support system supports the plant from a lower elevation to a higher elevation, in response to the growth of the plant.

1 Claim, 3 Drawing Sheets

Vining Plant Support Via Vertical Posts and Modular Braces

Vining Plant Support Via Vertical Posts and Modular Braces

Vining Plant Support Via Vertical Posts and Modular Braces

VINING PLANT SUPPORT VIA VERTICAL POSTS AND MODULAR BRACES

CROSS REFERENCE TO RELATED APPLICATION

This application claims benefit to: No. 62/646,876

BACKGROUND

There are two types of vining plants, ones with tendrils that grow naturally from the plant and are meant to hold onto anything it can find to help support the plant to comfortably grow vertically, and ones without tendrils that naturally grow vertically until the weight of the plant becomes too much to bear and are then pulled down by the weight and forced to grow on the grounds surface. In the past, multiple methods have been used to support plants that are not capable of supporting themselves through the natural means of tendrils or similar mechanisms. The simplest method has been to attach tomato and similar vining plants to rods, sticks or stakes (hereinafter, "the stake") that are inserted into the ground by tying them with cloth or plastic zip ties. This method is less than ideal because the plant only receives the support for the predetermined length of the stake (no extension can be added). Additionally, the plant's support is entirely dependant on the security of the single stake in the ground. If the stake were to fall over from a weak grasp of the soil, then the entire plant risks being terminally damaged.

One solution to this problem was the creation of the "tomato cage". The cage consists of 3-4 vertical wires or rods that are inserted into the ground which are perpendicularly attached to the surface of the wire circles that increase in size the higher you go. This adds a moderately more stable grasp of the soil as there are more points of contact, but the stability of the design still heavily depends on wires inserted into soil or another ground substrate. If outside conditions are less than ideal, or the plant grows past the highest point of the cage, the cages have been known to fall over and cause terminal damage to the plant especially in windy conditions. An unrealized problem that the cage creates in contrast to tying to stakes, is that the cage only supports these plants through their outermost growth; most commonly the leaves that grow outward away from the main stalk. The cage forces the plant to extend its leaves as far out as it can to rest on the wire circles in order to hold up the weight of the entirety of the plant, essentially reassigning the role of tendril to the leaves. This is a very superficial method of support, and for a tomato plant, for example, this can cause a lot of stress on the plant and result in a less than optimal yield. Another problem the cage creates is that it compresses the entire plant into a limited space. This can result in an ideal environment for diseases and pests. This also makes it difficult to prune and pick the fruit as the entire plant is crowded within a limited space because it is being blocked and contained by the wire cage. Based on the foregoing, it is the general object of the present invention to provide adequate support to a vining plant that overcomes the drawbacks of the prior art.

BRIEF SUMMARY OF THE INVENTION

It is the object of the present invention to provide a vertical plant support system that uses an L-shaped angle-bar (hereinafter "the angle-bar") that is inserted into the ground and anchored to provide a solid support to hold the hollow rectangular prism (hereinafter "the vertical post") that is attached to it. The vertical post has holes spread throughout its vertical length on all four sides. A brace-like attachment (hereinafter "the brace") is then attached with fasteners to the vertical post using the matching holes on parallel sides of the vertical posts as a point of contact at various points of the growth of the vertical growing plants. These braces can be attached to the vertical post at any time during the growth of the plant. There are extension connection pieces (hereinafter "the L-Connector") that attach to additional vertical posts which allow the vertical support to grow vertically and indeterminately along with the plant. This system supports the plant from the ground up to a higher elevation—as far as is required in specific increments (dependant on the length of the vertical post), in response to the growth of the plant.

DETAILED DESCRIPTION OF THE DRAWINGS

Figure 1:
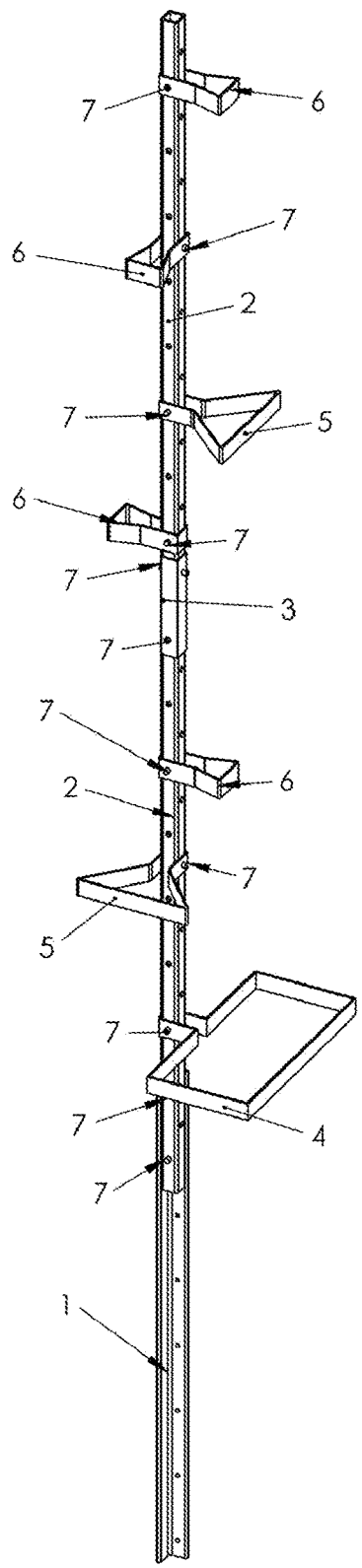
FIG. 1. Shows "Tall Configuration" of invention
FIG. 2. Shows "Short Configuration" of invention
FIG. 3. Shows unlabeled "Tall Configuration" of invention
FIG. 4. Shows zoomed in detail of "L Connector"
FIG. 5. Shows zoomed in detail of "Angle-Bar"
FIG. 6. Illustrates invention in use with plant
Figure 2:
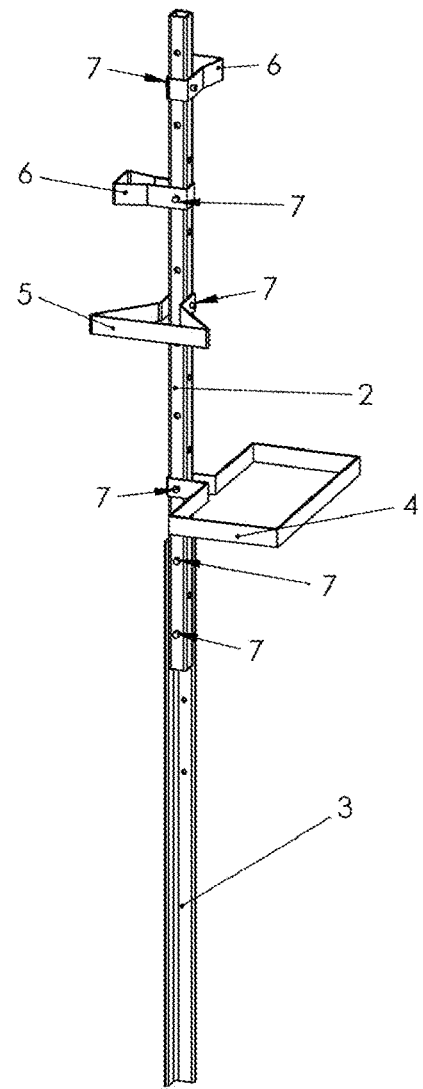

FIG. 1. FIG. 1 shows the "Vining Plant Support Via Vertical Posts and Modular Braces" in it's "tall" configuration with two vertical posts connected by one "L-Connector" piece and an example of how braces can connect to vertical posts. The labels correspond with the different parts explained herewith: "1"—Angle-Bar, "2"—Vertical Post, "3"—L-Connector, "4"—Large Brace, "5"—Medium Brace, "6"—Small Brace, and "7"—Fastener FIG. 2. FIG. 2 shows the "short" configuration of the "Vining Plant Support Via Vertical Posts and Modular Braces" using one vertical post attached to the Angle-Bar in the ground only. All the number callouts have the same correlations as described in FIG. 1.

Figures 3, 4, 5:
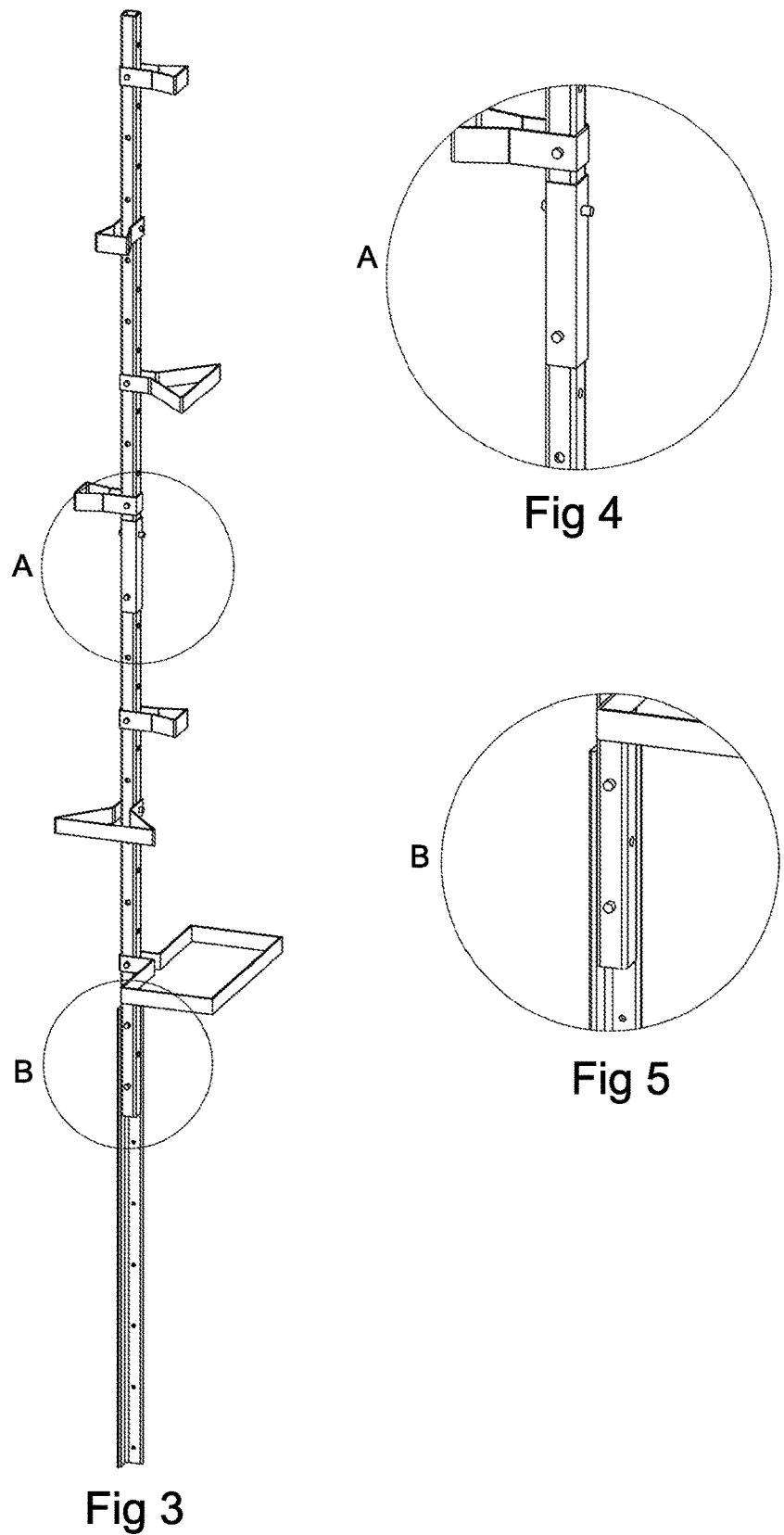

FIG. 3. FIG. 3 presents a cleaner view of the "tall" configuration of the "Vining Plant Support Via Vertical Posts and Modular Braces".

FIG. 4. FIG. 4 illustrates a zoomed in detail of of how the L-Connector fastens to the lower and upper vertical posts subsequently connecting both posts.

FIG. 5. FIG. 5 illustrates a zoomed in detail of how the lower vertical post connects to the Angle-Bar.

Figure 6:
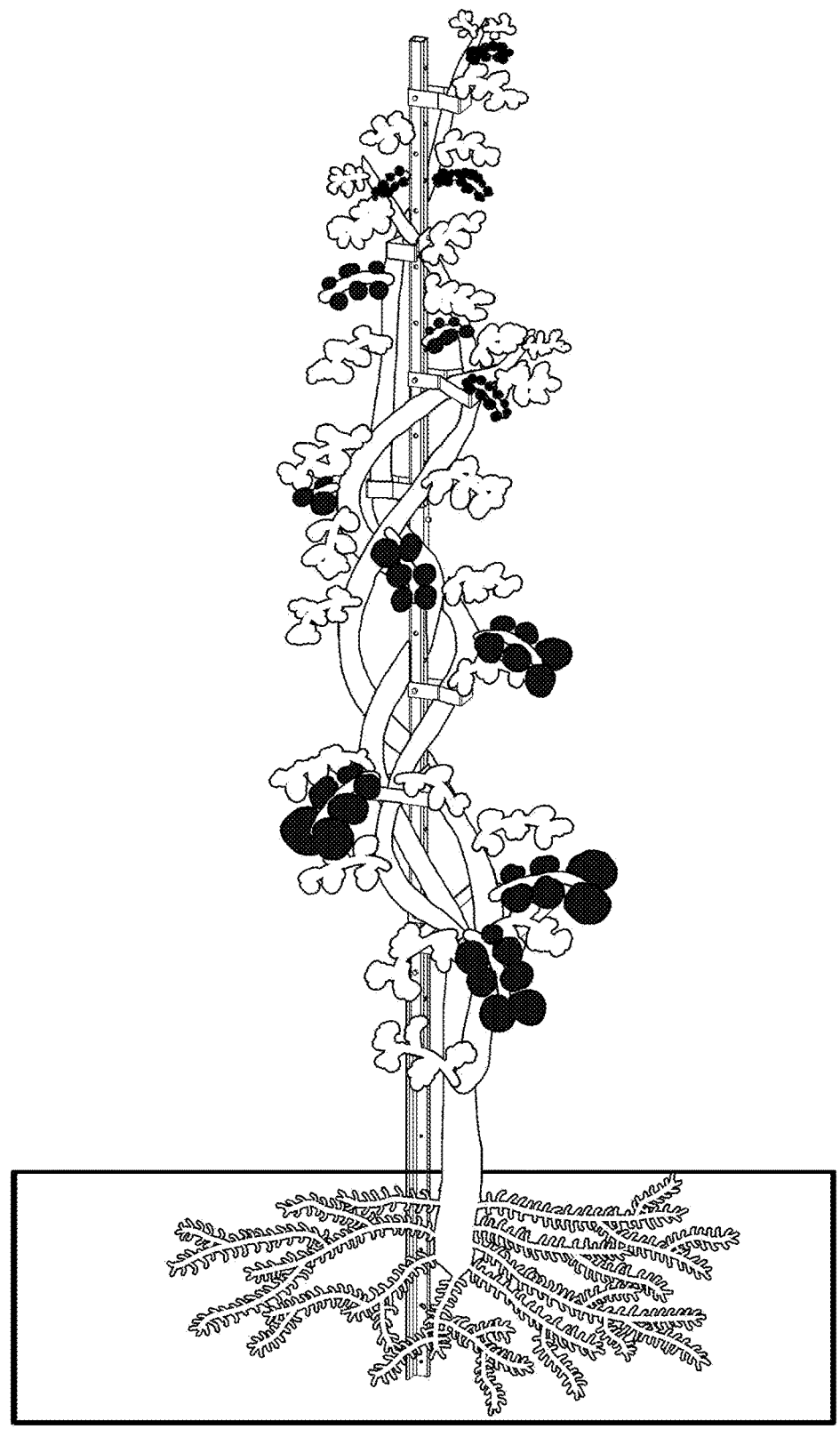

FIG. 6. FIG. 6 illustrates a possible configuration of the invention interacting with an actual vining tomato plant.

DETAILED DESCRIPTION AND BEST MODE OF IMPLEMENTATION

The present invention provides an apparatus for supporting plant life growing in a ground area which includes a vertical post that is symmetrical in shape and has alternating holes throughout its length. Also included is an angle-bar that is meant to be hammered into the ground to which the aforementioned vertical post attaches, through the lining up of holes and insertion of screws and/or alternative fasteners. Additional vertical posts can be attached above the previous vertical posts by using an L-Connector which mimics the design of the angle-bar and holds the vertical posts together through a right-angle connection design. The L-Connector also attaches by lining up the holes and then inserting fasteners to secure it in place to both posts.

Once the main vertical post assembly has been assembled, there will be up to three sizes of braces (small, medium, and large) that will be included with the basic assembly. Depending on the needs of the vining plant, the user will determine which brace is most appropriate to support the vine. Each brace attaches to the vertical post by the user slightly applying a "pull apart" force to the brace which allows the small gap in the back of the brace to expand enough so that it can be placed around the plant and then around the vertical post without causing any damage to the plant itself. Once the holes have been lined up, fasteners can be placed in order to secure the brace in place on the vertical post.

As the plant grows, more braces can be attached to support the vine in its vertical growth. One of the greatest advantages of our present invention is that the braces can also be removed and rearranged. When the fruit at the bottom of the plant has already been harvested and the vine no longer needs as much support, the brace can be removed from its original placement and then moved and attached to an alternate location where the plant is flowering or fruiting in order to provide additional support where it is needed.

It is the object of the present invention to be a modular assembly that can be easily adjusted to both the growing plant and in adaptability to various kinds of vining plants. Where the braces can be mounted in four different orientations providing coverage of support at 90 degree increments where holes are present along the vertical post.

It is the object of the present invention to take up minimal garden space and to allow the plant to focus its growth vertically. This will allow the user to better see the plant and properly harvest the fruit off the plant without being obstructed.

It is the object of the present invention to "grow" with the vertical growing plant as more attachments can be added and it can extend vertically indefinitely in predetermined increments along the length of the vertical post.

It is the object of the present invention to provide an apparatus for supporting plant life growing in a ground area wherein all parts are made of a durable material to minimize rusting or other deterioration thereof.

It is the object of the present invention to provide an apparatus for supporting plant life growth in a ground area wherein a single apparatus can be used for supporting multiple different types of vining plant life such as, but not limited to, tomato, cucumber, and melon plants.

It is the object of the present invention to be an apparatus that is capable of and expected to be re-used year after year.

It is the object of the present invention to minimize any damage that the growing plant can incur due to pests, diseases, natural elements, and lack of support whilst using this apparatus.

This system supports the plant from the ground to a higher elevation as far as is required in specific increments (depending on the length of the vertical post), in response to the growth of the plant.

It is the object of the present invention to focus support on the main vine, also known as the stalk, of the plant. This will ensure proper and healthy growth by reducing stress to the said plant.

It is the object of the present invention to support both determinate and indeterminate vining plants.

The invention claimed is:

1. An apparatus for supporting a vine of a plant comprising:
   A. a single stake having a first flange and a second flange forming an L-shaped cross section,
   said single stake being configured to be installed substantially perpendicularly into the ground,
   said single stake having a plurality of holes spaced a first distance apart along said first flange,
   B. a first post having a first side, a second side, a third side and a fourth side forming a rectangular cross section,
   said third side being opposite said first side and fourth side being opposite said second side,
   said first post having a length and further having a plurality of holes spaced along said length, said plurality holes of said first post extending from said first side to said third side at a second distance, said second distance being substantially the same as said first distance;
   C. a second post substantially identical to said first post;
   D. a connection piece having a first flange and a second flange forming an L-shaped cross section,
   said connection piece having a first longitudinal end and a second longitudinal end, said connection piece having a first aperture extending through said first flange proximate said first longitudinal end and a second aperture extending through said second flange proximate said second longitudinal end;
   E. a plurality of braces, each said brace extending in a direction transverse with respect to a longitudinal axis of said respective post, each said brace configured to support said vine; and
   F. whereby said first post is configured to connect to said single stake via screws or bolts and nuts, and said second post is configured to connect to said first post via said connection piece using screws or bolts or nuts.

\* \* \* \* \*